United States Patent [19]

Posel et al.

[11] 3,966,462
[45] June 29, 1976

[54] RECOVERY OF NITRIC ACID SOLUBLE TRANSITION METALS FROM SULFUR AND IRON CONTAINING ORES OF THE SAME

[75] Inventors: John G. Posel, Everett; Gregory P. Williams, Montlake Terrace; David N. Nilsen, Everett, all of Wash.

[73] Assignee: International Ore Technology, Inc., Everett, Wash.

[22] Filed: Apr. 18, 1975

[21] Appl. No.: 569,227

[52] U.S. Cl. .......................... 75/101 BE; 75/101 R; 75/117
[51] Int. Cl.² ......................................... C22B 15/08
[58] Field of Search ............ 75/101 BE, 117, 101 R; 423/24, 27

[56] References Cited
UNITED STATES PATENTS

| | | | |
|---|---|---|---|
| 3,656,937 | 4/1972 | Gandon et al. ................... | 75/101 R |
| 3,793,429 | 2/1974 | Queneau et al. ................... | 75/117 X |
| 3,869,360 | 3/1975 | Kane et al. ....................... | 204/105 R |
| 3,888,748 | 6/1975 | Brennecke ........................ | 75/117 X |

*Primary Examiner*—G. Ozaki
*Attorney, Agent, or Firm*—Christopher Duffy

[57] ABSTRACT

The ore is subjected to nitric acid leaching and the leach solution is heated to a temperature at which one of the additional sulfur and iron values is selectively insolubilized with respect to the solution, while the other is maintained in solution for subsequent separation from the liquor after the insolubles have been removed and the liquor has been neutralized. In addition, in one embodiment of the invention the heating and acid neutralization steps are controlled within certain prescribed limits to make it possible to remove the metals from the liquor by solvent extraction without the problem of lasting precipitates forming in the liquor and fouling the extraction process. Where there is a sizable amount of dissolved iron in the liquor, the liquor may be subjected to autoclaving at a temperature above about 149°C (300°F) to precipitate the iron as the oxide thereof. This effect is possible even where the liquor is high in sulfate concentration.

7 Claims, 2 Drawing Figures

3,966,462

RECOVERY OF NITRIC ACID SOLUBLE TRANSITION METALS FROM SULFUR AND IRON CONTAINING ORES OF THE SAME

THE INVENTION IN GENERAL

The invention concerns the hydrometallurgical recovery of nitric acid soluble transition metals such as copper, silver, nickel, cobalt, and zinc, from a sulfur and iron containing ore of the same. In particular, the invention concerns the recovery of the metals by a process of leaching them into a nitric acid leach solution from which they are then recovered by any one of several conventional leach liquor metal recovery techniques.

One object of the invention is to provide a process of this nature wherein the leaching operation requires as little as one-half hour, and produces a liquor containing upward of 99% or better of the metal values. Another object is to provide a process of this nature wherein the leaching operation selectively insolubilizes one of the additional iron and sulfur values with respect to the leach solution so that it can be removed as a commercially valuable byproduct, and at the same time produces a liquor from which the other additional value can be readily separated thereafter as another commercially valuable byproduct. A further object is to provide a process of this nature wherein the leaching operation produces a liquor that lends itself to the known preferential precipitation metal recovery techniques, including electrowinning and hydrogen precipitation. A still further object is to provide a process of this nature wherein the metals to be recovered, can be solvent extracted from the liquor without the problem of lasting precipitates forming in the liquor and fouling the extraction process. Still another object is to provide a process of this nature wherein notwithstanding that the liquor is high in sulfate concentration, dissolved iron can be economically removed from the liquor without the addition of large amounts of acid neutralizer. A further object is to provide a process of this nature wherein the acid can be recovered or regenerated in substantially a one-to-one ratio by conventional techniques. A still further object is to provide a process of this nature wherein the hydrometallurgically insoluble values can also be recovered in relatively pure form. Other objects include the provision of a process of this nature wherein the leaching operation can be conducted in the presence of a relatively inert gas, including one as cheap as air, and including the vapor from the reaction itself. Further objects include the provision of a process of this nature wherein the whole spectrum of metal values in the ore can be recovered without penalty, and the purity of the same will be approximately 99.95%; wherein the process can be carried out in an essentially closed system and is essentially pollution free; wherein the process is largely exothermic so that there is little necessity for adding heat to it; and wherein the process can be conducted either continuously or on a batch basis. Still further objects include the provision of a process of this nature wherein the mechanical system for the process is subject to modularization and is adaptable to the ganging of several units of the system within a small area or space; wherein all of the process reagents are readily available and/or regenerable; wherein the ore need not be concentrated beforehand; and wherein there is no necessity for employing pyrometallurgical processes in recovering the metal values from the leach liquor, nor for expensive structural materials in the system components, nor for excessively high operating parameters, such as temperatures and pressures.

According to the invention, these and other objects and advantages are realized by a process in which an aqueous leach solution is formed from the ore and at least a stoichiometric amount of nitric acid of about 30–50% by volume concentration. The solution is heated to a temperature at or above the melting point of sulfur while it is contained under a relatively inert atmosphere; and the temperature is controlled to substantially solubilize the metal value or values in the acid soluble phase of the solution while substantially insolubilizing one of the additional values with respect thereto. The one additional value is relatively separated from the acid soluble phase and the metal value or values are removed from the same. Preferably, the one additional value is precipitated from the acid soluble phase and then the precipitate is relatively separated therefrom.

Normally all of the acid insolubles are separated from the acid soluble phase before the metal values are removed therefrom. The precipitate may be separated with the other acid insolubles, or it may be separated in a different operation. Also, in the usual procedure, the other additional value is crystalized as a salt thereof and relatively separated from the acid soluble phase. The separation may be accomplished before or after the metal value or values are removed from the acid soluble phase.

For example, in one of the presently preferred embodiments of the invention, the temperature of the solution is controlled to precipitate the sulfur as elemental sulfur and then the sulfur is relatively separated from the acid soluble phase. Afterward, the pH of the phase is adjusted to precipitate the iron as a salt thereof and then the salt is relatively separated from the phase. The sulfur and iron precipitation steps are normally carried out between the leaching stage and the metal removal stage.

In another of the presently preferred embodiments of the invention, the temperature of the solution is controlled to precipitate the iron as a salt thereof and then the salt is relatively separated from the acid soluble phase. Afterward, the metal value or values are removed from the acid soluble phase, and then the phase is evaporated to crystallize and relatively separate the sulfur therefrom in the form of a sulfate salt. Normally, the iron precipitation step is carried out during the leaching stage, whereas the sulfate salt crystallization step is carried out after the metal value or values are removed from the acid soluble phase.

In the first mentioned embodiment, the leach solution is heated to a temperature of about 115°–125°C (239°–257°F), and then is flashed to the temperature of crystallization of sulfur, i.e. about 100°C (212°F). In the second mentioned embodiment, the solution is heated to a temperature above about 125°C (257°F) and preferably 125°–160°C (257°–320°F). The iron precipitates directly from the solution in this latter range as a hydrous oxide of the same. In each embodiment, the acid concentration is preferably about 40%. Both embodiments require about 30–60 minutes for a 98+% recovery of copper and the other metal values in a recycle system.

The prescribed temperatures normally require an overpressure of at least 50 psig. However, for reasons of economy, the pressure seldom exceeds above 120 psig.

Because of the total leaching capacity of the acid, the leach reaction need not be contained under an atmosphere which provides a supplemental oxidizing effect, and in fact the atmosphere may be inert with respect to the leach reaction. Therefore, the term "relatively inert" is used in describing the atmosphere, since the atmosphere may be an oxidizing gas, such as oxygen, or an oxygen-containing gas such as air; yet an oxidizing gas is not necessary to the process, and in fact, as indicated, a gas which is inert with respect to the leach reaction may be used in lieu of an oxidizing gas with equally good results. In short, the atmosphere need only be compatible with the reaction, and because of its cheapness, air is commonly employed as the pressurizing gas. Other examples of suitable gases are nitrogen, argon and helium.

In addition, the vapor from the reaction itself may serve as the pressurizing medium.

For the best results, the leach solution is subjected to agitation while the heat is applied to it. The agitative effect is preferably mechanically generated and the gas is preferably introduced into the leach container through the body of the agitator.

A still further advantage may be gained by forming an aqueous suspension of the ore and then adding the suspension to the acid, preferably by injecting the suspension into the acid in the leach container while the acid is under agitation and pressurization therein.

The leach solution is preferably formed and heated in repeated batches, each of which is formed at a temperature of less than 100°C before it is heated to a temperature at or above the melting point of sulfur for the purposes indicated, the heat transition being as rapid as possible, however, to minimize the formation of "gummy" sulfur in the transition. Typical reaction formulae are given below, the latter two including the iron hydroxide precipitate produced in the higher temperature range of the second embodiment:

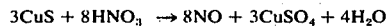
$$3CuS + 8HNO_3 \rightarrow 8NO + 3CuSO_4 + 4H_2O$$

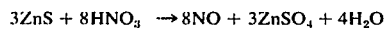
$$3ZnS + 8HNO_3 \rightarrow 8NO + 3ZnSO_4 + 4H_2O$$

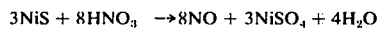
$$3NiS + 8HNO_3 \rightarrow 8NO + 3NiSO_4 + 4H_2O$$

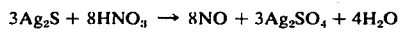
$$3Ag_2S + 8HNO_3 \rightarrow 8NO + 3Ag_2SO_4 + 4H_2O$$

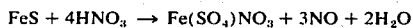
$$FeS + 4HNO_3 \rightarrow Fe(SO_4)NO_3 + 3NO + 2H_2O$$

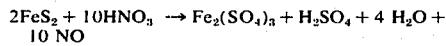
$$2FeS_2 + 10HNO_3 \rightarrow Fe_2(SO_4)_3 + H_2SO_4 + 4H_2O + 10NO$$

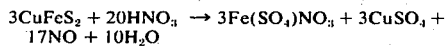
$$3CuFeS_2 + 20HNO_3 \rightarrow 3Fe(SO_4)NO_3 + 3CuSO_4 + 17NO + 10H_2O$$

$$FeS + H_2O + 3HNO_3 \rightarrow Fe(OH)_3\downarrow + H_2SO_4 + 3NO$$

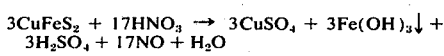
$$3CuFeS_2 + 17HNO_3 \rightarrow 3CuSO_4 + 3Fe(OH)_3\downarrow + 3H_2SO_4 + 17NO + H_2O$$

A continuous process is possible when the various parameters are controlled to effect the foregoing results.

As indicated, so long as the leach solution is maintained at a temperature of about 115°–125°C, the sulfur will assume a molten condition and will float to the surface of the leach solution as a supernatant liquid. Then, when the solution is flashed to the temperature of crystallization of the sulfur, such as about 100°C or less, the molten sulfur will agglomerate or solidify, and will form spherical beads of elemental sulfur which readily precipate in the flash tank, and are removed as essentially 97% pure or greater elemental sulfur. On the other hand, if the temperature of the solution falls below the melting point of sulfur, i.e. about 115°C, the sulfur will assume a gummy state, and the gummy material will agglomerate about the metal values, and will tend to insulate them from the reaction, so that as a result, clinkers are formed which include a large amount of the values that are sought.

In the flash tank, the temperature is critical only in that the molten sulfur should not be allowed to reassume the gummy state, in which it might then take up acid insolubles, such as silicates, which in turn would adulterate the sulfur by-product. Of course, it is also desirable to lose as little heat energy as possible in the flash step, and therefore, the temperature in the flash tank is normally maintained at about 80°–100°C.

Since after about 60 minutes time, the additional quantity of values which are removed by the acid, is so insignificant as to not warrant operating at longer times, the optimum leaching time is about 30–60 minutes.

When the leach liquor is high in nitrate, i.e. 5 grams per liter or greater, the nitrate acid metal values are preferably transferred into a sulfate acid solution by solvent extraction, so as to render the solution more susceptible to the preferential precipitation techniques. It has been found in this connection that when nitrate acid liquors of this concentration are preneutralized, they will not cause decomposition of the extractants commonly used in conventional solvent extraction processes.

Moreover, it has been found that when the temperature of the leach solution is controlled to establish an iron content of no greater than 15 grams per liter in the leach liquor, and an acid neutralizer is added to the liquor to establish a pH of about 1–2 therein and to produce salts of the acid which are soluble in the liquor, the liquor can be contacted with a copper specific aqueous insoluble organic extractant liquid, while the foregoing pH is maintained in the liquor, and the extractant will extract the copper into the extractant liquid without the problem of insoluble metal hydroxides and/or other insoluble metal and acid neutralizer salts forming in the liquor. The organic extractant liquid and the liquor are then relatively separated from one another and the copper is recovered from the liquid.

Preferably, the acid neutralizer is selected from the group consisting of hydroxides, carbonates, bicarbonates and phosphates of ammonia and the alkali metals. Ammonium, sodium and potassium hydroxide are the presently preferred neutralizers.

The extractant in the organic solvent liquid is preferably selected from the group consisting of the alpha substituted hydroxy oximes and the hydrocarbyl-substituted 8-hydroxyquinolines.

The above-mentioned second embodiment provides a direct, one-step means of controlling the temperature of the leach solution to reduce the content of the iron values to 15 grams per liter or less; and therefore, it is presently preferred to employ the higher temperature range of this embodiment during the leach operation. However, the first mentioned embodiment also provides a means of reducing the iron content, although in two steps as indicated.

In the first mentioned embodiment, the iron is normally relatively removed from the sulfur-free acid soluble phase by precipitating it as a hydroxide, and thereafter separating the hydroxide from the acid soluble phase, again by conventional techniques such as centrifugation, filtration, or the like. Both the hydroxide and the siliceous materials of the insoluble phase, are highly salable by-products, the latter taking the form of a neutral tailing of sandlike consistency which is quite suitable for road-building. The insoluble phase may also yield gold and platinum.

In both embodiments, where the iron content is excessive, the liquor may be subjected to autoclaving at above about 149°C (300°F) to precipitate the dissolved iron as the oxide thereof. This effect is possible even where the liquor has a high sulfate concentration, as for example, in the second embodiment.

In the final recovery stage, the metal value or values may be crystallized, precipitated, and separated from one another in a gravity separator; and/or preferentially precipitated as indicated. The precipitation step may be effected by reacting the previously neutralized (i.e. pH of about 4.2–7) sulfur-and-iron-free acid soluble phase, with a pressurized reducing agent in a heated and pressurized autoclave to precipitate the metal value or values therefrom; or alternatively, electrowinning and other conventional techniques may be used for the recovery process. As indicated earlier, however, electowinning is preferably preceded by solvent extraction, in order to transfer the metal values into a sulfate acid solution before they are recovered from the same.

If the leach liquor contains more than a negligible amount of silver, the silver may be recovered from the same by hydrogen precipitation or electrowinning, and either operation may be conducted before the liquor is subjected to solvent extraction for removal of copper, because of the higher oxidizing potential of the silver.

To regenerate the acid, the gaseous phase in the leach container is collected externally of the container and the nitrogen gases are oxidized to the higher oxides of nitrogen, and intermixed with water in an absorption tower. The regenerated acid is then returned to the container for reuse. The weak nitric acid generated in the autoclave may also be returned to the container; or it may be neutralized with ammonium hydroxide and removed as another highly salable by-product, ammonium nitrate, the difference in acid level being made up from time to time by the addition of a small amount of new acid to the leach container.

The acid insoluble and acid soluble phases may be separated by centrifuging or filtering the sulfur and/or iron unloaded solution to remove the insoluble phase from the soluble.

The ore may be in raw form or it may be enriched to a typical concentration of the order of about 25–30% by weight or higher.

The spent liquor contains soluble salts of the neutralizing agent. These are recovered, for example, by evaporating the water in the liquor to crystallize the salts. Preferably, ammonia is used as the neutralizing agent so that the salts are principally nitrates and/or sulfates of ammonia.

Water, therefore, is the only component of the leach liquor returned to the environment, assuming that no carbonate was used as the neutralizing agent, in which case carbon dioxide would also be returned to the environment.

DESCRIPTION OF THE DRAWINGS

These features will be better understood by reference to the accompanying drawings wherein.

DESCRIPTION OF THE PREFERRED EMBODIMENTS

Figure 1:
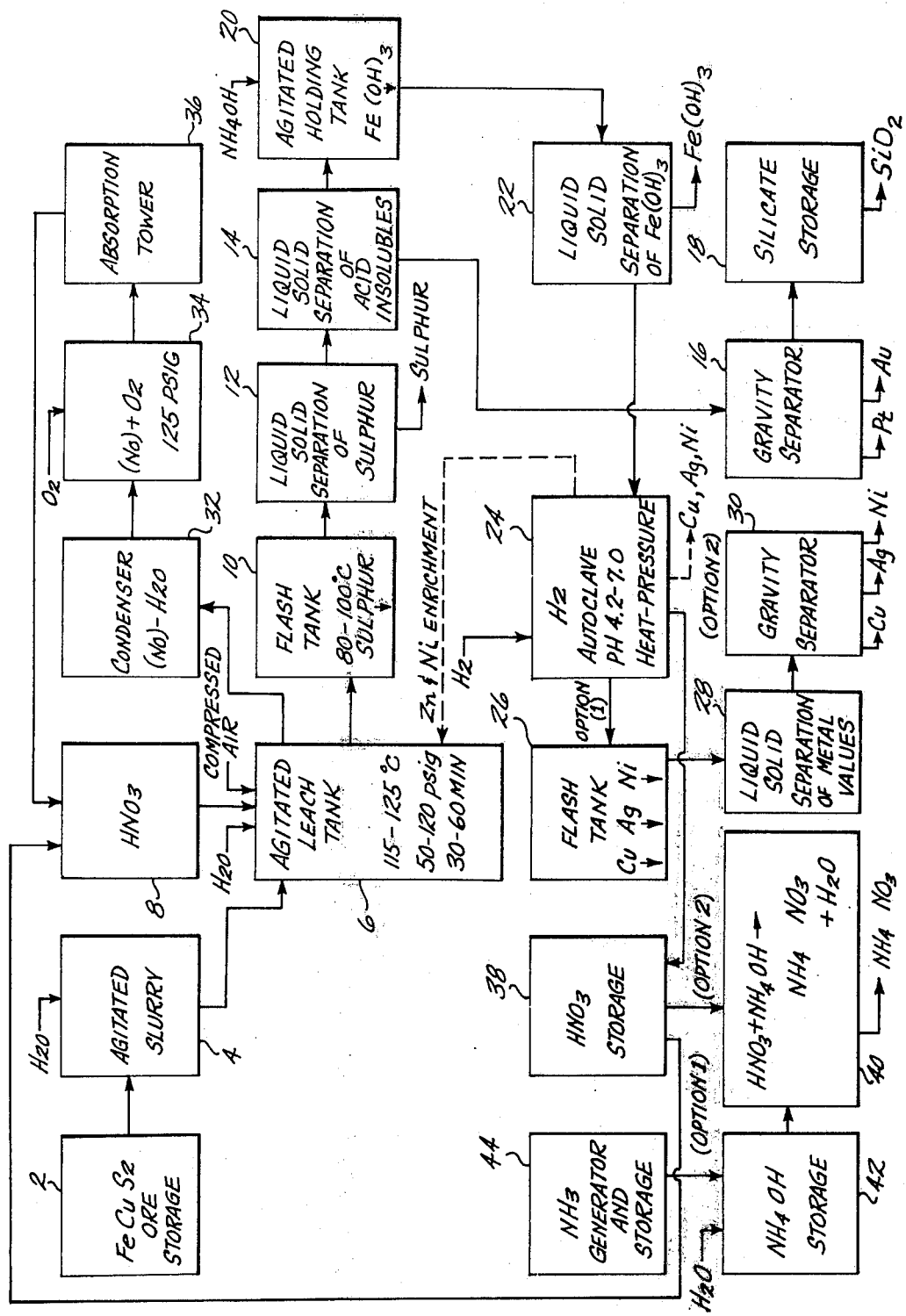
FIG. 1 is a flow sheet of the first embodiment.

Referring to the flow sheet in FIG. 1, it will be seen that a portion of ore or concentrate is fed from a storage site 2 to a mixing tank 4 where water is added to the same and the mixture is agitated to form a slurry of the ore. Meanwhile, a stoichiometric amount of the acid is transferred to an autoclave 6 from a holding tank 8 for the same, and an aqueous solution of the acid is prepared under an overpressure of compressed air at approximately 100 psig, the air being released into the autoclave or leaching tank 6 through a system of orifices in an impellor of an agitator housed therein. Next the slurry is added to the agitated and pressurized aqueous acid solution under low heat, to attain a mixing temperature of about 50°–60°C, the pulp density of the resulting leach solution not being particularly significant so long as the solution is workable and readily transferable by pump in a conduit. As soon as the acid and the slurry are thoroughly mixed, the temperature of the solution is raised to about 115°–125°C and 100 psig, respectively, to melt and float the released sulfur on the surface of the solution while the solution undergoes leaching for about 30–60 minutes, the metal values being extracted to the extent of approximately 99.95 per cent within this time.

When the extraction is complete, the solution is pumped into a flash tank 10 of about 80°–100°C and zero psig, where the molten sulfur agglomerates into spherical beads of about 2–4 millimeters in diameter, that precipitate in the solution forming a mat of elemental sulfur at the bottom of the tank. Thereafter, the solution is pumped through a 30–50 Standard Tyler mesh screen 12 which removes particles of one-half millimeter in diameter or greater, and the elemental sulfur mat on the screen is subsequently removed and discharged from the system as a salable 97% pure product.

The now sulfur-free solution is next sent onto a liquid-solid separator 14, such as a –600 mesh centrifuge, where the solution is spun through the walls of the same to remove the acid insoluble silicates, and other insolubles such as platinum and gold. The insolubles are then transferred to a gravity separator 16 where the platinum and gold are separated from the silicates, and the latter is stored at 18 for discharge from the system as a salable product, particularly for road building.

Alternatively, the insolubles may be removed by filtration or sedimentation.

The liquid medium from the separator is now transferred to an agitated holding tank 20 where the pH of the same is adjusted by the addition of an excess of ammonium hydroxide, to precipitate the now sulfur-free iron as a hydroxide, the quantity of ammonium hydroxide being sufficient to stabilize the iron hydroxide, as well as to neutralize the solution to a pH of about 4.2–7. Once more, the solution is put through a liquid solid separator 22, such as a finer one-micron centrifuge, and the iron hydroxide is collected and discharged from the system as another highly salable product.

The now sulfur-free and iron-free medium is transferred next to a hydrogen autoclave 24 where its temperature is raised to at least 66°C (370°F), and preferably to a temperature of the order of 188°C (370°F), to achieve the optimum residency time for the reduction process which is effected in the autoclave. The hydrogen is introduced at a partial pressure of at least 100 psig, and preferably of the order of 500 psig, while the solution is agitated for at least 15 minutes and more preferably of the order of 30 minutes. Then, the partial pressure of the hydrogen is reduced to zero, and after a period of 2 minutes, raised again to 500 psig; whereafter, assuming that the solution has been previously nucleated, it is repeatedly pulsed in this manner for a total of about 1 hour, to precipitate the copper from the solution by the well-known catalyzed crystalline growth process. Thereafter, the copper mat in the bottom of the autoclave 24 is pumped into a flash tank 26, to cool and relieve the pressure on the material, and the precipitate is filtered to a damp cake in a liquid solid separator 28, and then dried and packaged in a nitrogen atmosphere.

If the ore contains silver, the silver is nucleated along with the copper in the autoclave 24, and the precipitate is flashed, filtered and dried, and then transferred to a gravity separator 30 to separate the respective values.

Alternatively, the copper and silver may be preferentially precipitated in the autoclave 24, the pressure of the autoclave being elevated to about 1200 psig for purposes of separating the silver.

It is also possible to recover the values by electroplating and other conventional techniques.

If a copper ore contains nickel, the copper (and silver) are precipitated short of depletion, and the effluent from the autoclave 24 is recycled to the leach tank 6 until the nickel concentration is such that a small amount of the copper can be precipitated to completion, with the nickel on its surface, thereby producing a copper-contaminated nickel which can be removed from the system.

Likewise, if the ore contains zinc, the effluent from the autoclave 24 is recycled to the leach tank 6 until it attains a concentration at which it is worthwhile to shunt off the effluent to an electroplating battery for recovery of the zinc.

If the ore contains lead, the lead is precipitated in the leach tank as lead sulfate, and the sulfate is subsequently removed with the iron hydroxide.

To regenerate the acid, the gaseous phase in the leach tank 6 is bled off to a condenser 32 where the water vapor in the same is removed; and the phase is then pressurized with oxygen at about 125 psig (see stage 34), to oxidize the nitrogen gases to the higher oxides of nitrogen, such as nitrogen dioxide; whereafter the oxides are bubbled through an absorption tower 36 to be intermixed with water for the formation of new nitric acid.

The weak nitric acid generated in the autoclave 24 is collected in a storage tank 38. The acid may be returned to the leach tank 6; or alternatively, it may be neutralized with ammonium hydroxide in tank 40, to form another highly salable by-product, ammonium nitrate. The ammonium hydroxide is generated and stored in a plant 42, and the ammonia for the same is generated and stored in a plant 44.

The difference in acid level is made up from time to time by the addition of a small amount of new acid to the acid supply.

Figure 2:
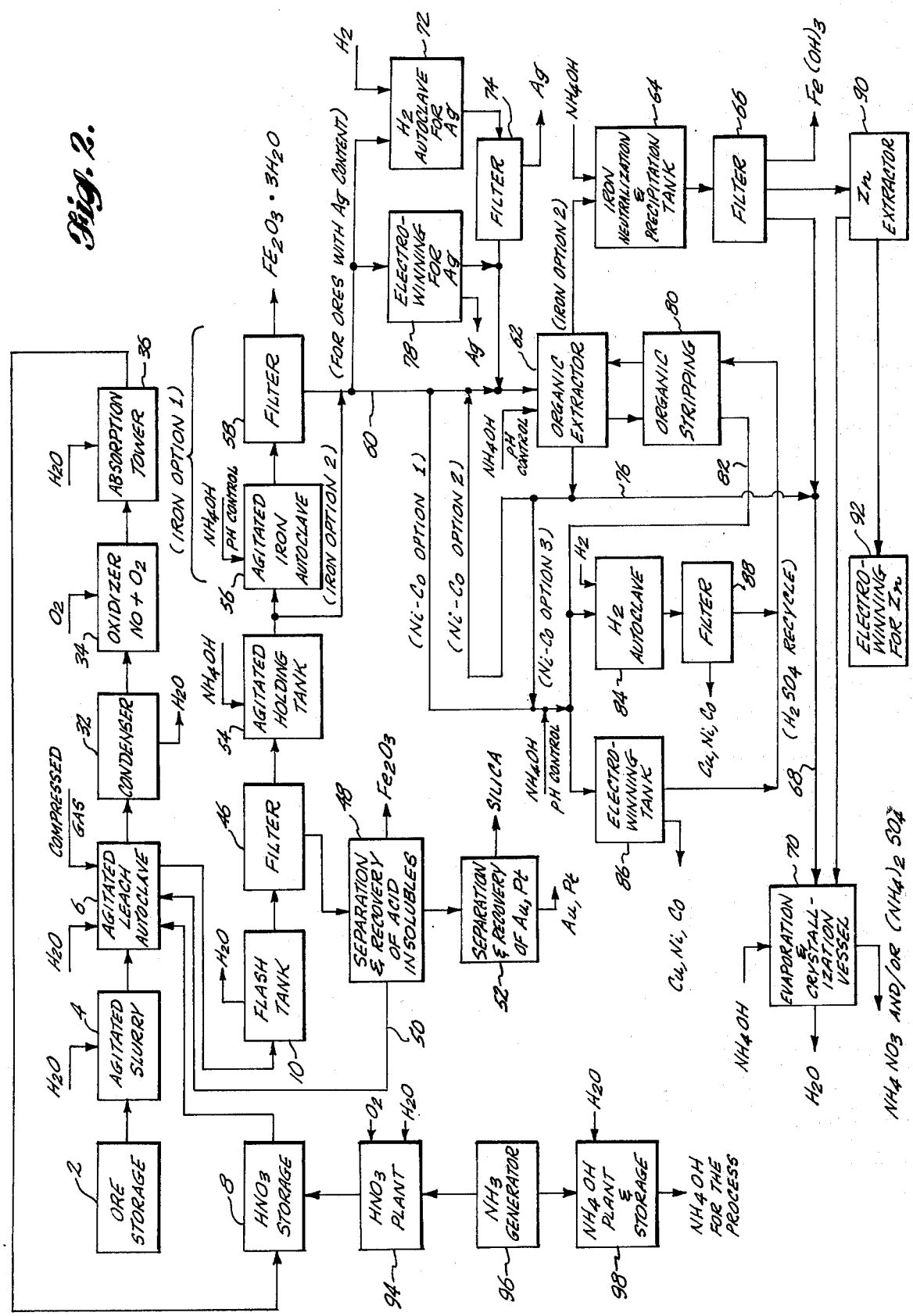
FIG. 2 is a flow sheet of the second embodiment.

Referring now to FIG. 2, it will be seen that as in FIG. 1 a portion of the ore or concentrate is fed from the storage site 2 to a mixing tank 4 where water is added to the same and the mixture is agitated to form a slurry of the ore. Meanwhile, water and a stoichiometric amount of nitric acid are added to the autoclave 6, the acid being taken from the holding tank 8. In the autoclave, the aqueous acid solution is agitated as in FIG. 1, and is brought up to an operating temperature of about 125°–160°C (257°–320°F) and preferably 138°–149°C (280°–300°F). Also, a gas overpressure of about 80–100 psig is established, using compressed air or some other relatively inert gas as explained hereinabove. Ultimately, when the solution is at operating temperature, the ore slurry is injected into the solution through a metering pump and an acid concentration of about 30–50% by volume is established in the solution.

Where the ore contains sulfides, the sulfides are converted to elemental sulfur and/or sulfates, the amount of one over the other being dependent upon the overall acid concentration, the temperature, the time of slurry injection, and the total time of leaching. Generally, the longer the leach time, and the higher the temperature and overall acid concentration, then the greater is the formation of sulfate. Also, the longer the leach time and the higher the temperature and overall acid concentration, then the lower is the concentration of iron in the leach liquor as the liquor leaves the autoclave, and the greater is the recovery of nitrogen oxides and thus the recovery of nitric acid. Typically, after about an hour of leach time in the foregoing temperature range, the sulfides of nickel, copper, silver, zinc and cobalt are substantially solubilized in the leach solution as nitrates and sulfates thereof, and the iron is substantially precipitated as a hydrous oxide of the same. The precipitate collects in the bottom of the autoclave with the other insolubles, and as in FIG. 1, these are principally refractory materials such as silica, and noble metals such as gold and platinum.

As indicated, the sulfur does not always fully convert to the sulfate form. Therefore, when the extraction is regarded as economically complete, the solution is pumped into a flash tank 10 where the pressure on the solution is released to about zero psig and its temperature is reduced to approximately the boiling point of the solution, i.e. about 93°–104°C (200°–220°F). In the flash tank, any molten sulfur which was present in the solution, solidifies and collects with the other precipitates in the bottom of the tank. The accumulated precipitates are then separated from the liquor in a filter 46, and are sent on to a separation and recovery stage 48 where the iron values are converted to iron oxide and the oxide is separated from the other precipitates. Any unreacted ore is returned to the autoclave 6 in line 50. The silicate fraction is sent on to a further recovery stage 52 where gold and platinum, if present, are separated and recovered from the fraction by conventional means. If there is appreciable sulfur in the precipitates, it can be separated as in FIG. 1.

Meanwhile, the filtered liquor is transferred from the filter 46 to an agitated holding tank 54 where an acid neutralizing agent such as ammonium hydroxide is added to the liquor. The degree to which the acid is neutralized is dependent upon the amount of unprecipitated iron which remains in the liquor, the nature and content of the other metal values in the liquor, including the nature and content of the nickel, cobalt, silver, zinc and copper values, and finally, the method to be used for separating the unprecipitated iron. If the liquor contains only unprecipitated iron and copper as economically recoverable values, then either of two options may be used for the recovery of the iron values. See Iron Options 1 and 2 in FIG. 2. However, if the liquor contains a sizable amount of unprecipitated iron, as well as one or more of the nickel, cobalt, zinc, copper and silver values, then it is more economical to recover the iron values with what is indicated as Iron Option 1 in FIG. 2. Where there is no unprecipitated iron present in the liquor, or the concentration is relatively small, as for example, where the ore is essentially iron free, then neither of the two iron options need be used.

Referring now to Iron Option 1, it will be seen that the solution in the holding tank 54 is transferred to an agitated autoclave 56, where the solution is heated to a temperature of about 149°–260°C (300°–500°F), and maintained under a pressure equal to the vapor pressure of the solution at that temperature. Also, additional acid neutralizing agent is added to the solution if the amount which was added in the tank 54 was insufficient. Ultimately, the iron in the solution precipitates out as a ferric-oxide/hydroxide mixture which is substantially free of non-ferrous metal values and in a form that is readily filterable from the solution. The solution is then transferred to a filter 58 with the iron precipitate, and the precipitate is recovered as another salable product, while the iron-free liquor is sent on to the next recovery stage in the process, using a feed line 60.

Alternatively, in Iron Option 2, the iron containing solution in the tank 54 is sent directly into the feed line 60 which introduces the solution in turn into a solvent extractor 62. The extractor uses a copper-specific extractant, and after the solution has been subjected to an extraction process for the copper, as shall be explained, it is then transferred to an iron neutralization and precipitation tank 64, where the solution is agitated and a stoichiometric amount of ammonium hydroxide or some other acid neutralizing agent is added to it. In this case, however, ferric hydroxide is precipitated, the pH being in the range 4–7. The ferric hydroxide is filtered and recovered at 66, and the iron-depleted aqueous salt solution is transferred in feed line 68 to an evaporation and crystallization vessel 70 where the salts in the solution are also recovered.

There is also an intermediate option for the circumstance wherein the solution in feed line 60 contains more than a negligible amount of silver. In such a case, the solution is transferred to a silver recovery stage 72, 74 and 78 where the solution is subjected to either electrowinning or hydrogen autoclaving. In the latter instance, the solution is heated to 121°–149°C (250°–300°C) in an agitated autoclave 72 and is exposed to hydrogen gas while being maintained at a total pressure of between 500 psig and 700 psig. Under these conditions, the silver is precipitated and thus separated from a solution containing other values such as nickel, cobalt, zinc and copper. The contents of the autoclave 72 are then passed through a filter 74 to recover the silver. The silver-depleted solution is then returned to the feed line 60 where it may pass into the solvent extractor 62, or if the solution contains no copper, then it may go directly to a nickel-cobalt recovery stage 76, etc., where the latter values are removed, if they are present in the solution.

Alternatively, the silver containing solution may be subjected to electrowinning at 78, and then sent on to the solvent extractor 62; or if the solution contains no copper at all, then it may be sent on to the nickel-cobalt recovery stage, as was done in the case of the autoclaving option.

Assuming now that the liquor in line 60 contains copper in desirable quantities, the liquor is subjected to extraction by an organic copper-specific extractant such as a kerosene solution of LIX-64N, an extractant made by General Mills Corporation of Minneapolis, Minn. The extraction process is accomplished in a multi-staged, counter-current extraction cell 62 wherein the aqueous phase is mixed thoroughly with the organic phase and then the phases are allowed to separate. Both phases are then transferred in counter-current fashion to other stages, and the operation is repeated. Meanwhile, an acid neutralizing agent such as ammonium hydroxide is added to the aqueous phase to control its pH in the range of about 1–2. This aids in the transfer of the copper, and assuming that there is proper mixing of the phases, three stages of contact, and a suitable aqueous to organic flow rate, copper is removed from the aqueous phase in amounts greater than 99%.

If no desirable metal values are present in the copper depleted aqueous phase, then it is sent directly to the evaporization and crystallization vessel 70. However, if nickel and/or cobalt are present it is sent to the nickel-cobalt recovery stage 76, etc. Meanwhile, the copper bearing organic phase is stripped of the copper in a stripping tank 80, using a dilute sulfuric acid stripping solution. The operation of this tank is much the same as that of the extraction cell 62, in that the respective phases flow counter-current to one another and mix and separate in each stage. At the close of the operation, the copper depleted organic phase in the tank is recycled to the cell 62, and the acidsulfate copper stripping solution is transferred through feed line 82 to either a hydrogen autoclave 84 or an electrowinning tank 86.

In the autoclave 84, the stripping solution is agitated and heated to an elevated temperature, 177°–232°C (350°–450°F). In addition, the solution is exposed to hydrogen gas and is maintained at a total pressure of about 500 psig to 700 psig. Under these conditions, the copper precipitates as a finely divided powder which is substantially free of impurities. The poweder is removed in a filter 88. The dilute sulfuric acid which is generated in the reaction is recycled to the organic stripping stage of tank 80.

In the electrowinning tank 86, the copper is recovered by conventional methods of electrowinning and the dilute sulfuric acid which is generated in the tank is recycled to the organic stripper 80.

Where nickel and cobalt are present in the liquor, they can be extracted from the same by an organic extractant such as LIX-64N in kerosene, in a manner similar to the process for extracting the copper. See Nickel-Cobalt Option 2. However, for the extraction to take place, the pH of the liquor must be maintained at about 6 or above, and this is accomplished by adding a sufficient amount of acid-neutralizing agent such as ammonium hydroxide. Once again, dilute sulfuric acid is used to strip the metals from the organic phase, and the metals are removed in turn from the sulfate solution by electrowinning in tank 86. Meanwhile, the generated sulfuric acid is recycled to the organic stripping stage. Alternatively, the metals may be recovered by hydrogenation as indicated.

Where nickel and cobalt are present, the copper-depleted aqueous phase may also be subjected to the option of transferring it directly to either the hydrogenation autoclave 84 or the electrowinning tank 86. See Nickel-Cobalt Option 3.

Moreover, where the leach liquor does not contain an economically desirable quantity of copper, but does contain nickel and/or cobalt, then it may be transferred directly to the hydrogenation tank 84, or to the electrowinning tank 86. See Nickel-Cobalt Option 1. That is, the organic extraction stage may be bypassed.

In the hydrogenation process, the nickel and/or cobalt-containing solution is agitated and heated to an elevated temperature of about 149°–260°C (300°–500°F). Also, a hydrogen overpressure is maintained to a total pressure of about 500 psig to about 900 psig. A metal seed or other suitable catalyst may also be used. Again, the metal or metals are recovered as a powder, and if both are recovered, they may be separated by any one of several conventional methods, including precipitating the cobalt as a carbonate in an ammonium carbonate solution, where the nickel is soluble.

If there is an appreciable amount of zinc present in the ore, the iron-depleted aqueous salt solution leaving the filter 66 is subjected to an ion exchange extraction (or other extraction process) in extractor 90. The organic phase is stripped and then the stripping solution is transferred to an electrowinning tank 92. Meanwhile, the zinc-depleted aqueous phase in extractor 90 is sent on to the evaporation and crystallization vessel 70.

Regardless of which path the process follows, the spent liquor in the vessel 70 is treated with a stoichiometric amount of an acid neutralizing agent. The liquor is then evaporated to crystallize the nitrate and/or sulfate salts which are present. If ammonia was used as the acid neutralizing agent throughout the process, the salts are principally nitrates or sulfates of ammonia. These are quite salable in the agricultural industry as fertilizers.

To regenerate the nitric acid which is used in the autoclave 6, the gaseous phase is bled off from the autoclave and transferred to a condenser 32, where the water vapor in the phase is removed. The gases are then oxidized with either oxygen or air in an oxidizer 34, and the resulting higher oxides of nitrogen are passed counter-current with water in an absorption tower 36 to generate the acid.

The gaseous phase in the autoclave 6 is particularly high in nitrous oxides.

The regenerated acid is supplemented from an acid production plant 94 which is supplied in turn by an ammonia generator 96 that also supplies an ammonium hydroxide plant 98.

The following examples illustrate the process. In each of the first three examples, a 200 gram sample of the ore was processed in a stainless steel autoclave at a pulp density of 287 grams/liter. Using a theoretical extraction of 100% of the copper, silver or nickel, a leach liquor of about 60–100 grams/liter was produced for optimum recovery of the metals.

EXAMPLE I

The first sample to be treated was a copper sulfide concentrate with the following composition by weight:

| | |
|---|---|
| Copper | 25.8% |
| Iron | 25.0% |
| Sulphur | 38.7% |
| Silicon Dioxide | 5.0% |

Essentially this is a chalcopyrite concentrate containing chiefly the sulfides of iron and copper.

Variances in temperature, overpressure, concentration ratio of acid to mineral, time of leach, and degree of agitation were made to determine their effect on putting copper into solution.

After each sample was leached, the residue was washed, filtered, dried, and analyzed.

For a 200 gram sample, 654 milliliters of 40% acid by volume is necessary to achieve stoichiometry.

The results are listed in the following tables, 1 through 5.

TABLE 1

(TEMPERATURE PARAMETER)

| | | LEACH TANK | | | | | ANALYSIS BY WT. | | | | EXTRACTION BY WT. | | |
|---|---|---|---|---|---|---|---|---|---|---|---|---|---|
| Temp (°C) | Time (Min) | Acid Conc (%) | Vol (ML) | Gas used | overpress (Psig) | Cu Conc Weight (GM) | Cu (%) | Fe (%) | S. (%) | Insolubles (%) | Cu (%) | Fe (%) | S (%) |
| 101 | 60 | 40 | 654 | O₂ | 100 | 200 | 2.34 | 7.1 | 32.5 | 52.4 | 98.95 | 94.3 | 83.2 |
| 105 | ↓ | ↓ | ↓ | ↓ | ↓ | ↓ | 5.46 | 9.8 | 30.4 | 46.6 | 95.2 | 91.06 | 82.3 |
| 110 | | | | | | | 2.97 | 7.85 | 13.8 | 69.8 | 98.27 | 95.28 | 94.64 |
| 115 | | | | | | | .3 | 7.5 | 20.9 | 66.4 | 99.8 | 95.26 | 91.46 |
| 120 | | | | | | | .2 | 8.2 | — | — | 99.88 | 94.66 | — |
| 125 | ↓ | ↓ | ↓ | ↓ | ↓ | ↓ | .2 | 6.2 | 26.3 | 64.4 | 99.88 | 95.96 | 88.9 |

TABLE 1A

| | | | | | | | | | | | | | |
|---|---|---|---|---|---|---|---|---|---|---|---|---|---|
| 105 | 60 | 40 | 654 | N₂ | 100 | 200 | 6.4 | 14.6 | 31.5 | 44.7 | 95.1 | 86.3 | 81.0 |
| 110 | ↓ | ↓ | ↓ | ↓ | ↓ | ↓ | 5.24 | 10.2 | 31.45 | — | 95.2 | 90.3 | 80.5 |
| 120* | | | | | | | 5.5 | 13.7 | 27.2 | 47.7 | 95.2 | 88.0 | 84.5 |
| 125* | | | | | | | 5.4 | 14.5 | 28.7 | 43.8 | 95.0 | 86.1 | 82.4 |
| 130* | ↓ | ↓ | ↓ | ↓ | ↓ | ↓ | 5.2 | 14.7 | 29.2 | 46.6 | 95.5 | 87.6 | 83.1 |

*Std. Agitation Speed with Large Prop

TABLE 2

(Pressure Parameter)

| LEACH TANK | | | | | ANALYSIS BY WT. | | | | EXTRACTION BY WT. | | |
|---|---|---|---|---|---|---|---|---|---|---|---|
| Gas Overpress | Time Used | Temp | Acid Conc | Vol | Cu Conc Wt | Cu | Fe | S | Insolubles | Cu | Fe | S |

TABLE 2-continued

| (Psig) | | (Min) | (°C) | (%) | (ML) | (GM) | (%) | (%) | (%) | (%) | (%) | (%) | (%) |
|---|---|---|---|---|---|---|---|---|---|---|---|---|---|
| 50 | $O_2$ | 60 | 105 | 40 | 654 | 200 | 2.1 | 8.0 | 32.9 | 54.5 | 98.4 | 93.75 | 83.7 |
| 70 | ↓ | ↓ | ↓ | ↓ | ↓ | ↓ | 4.03 | 8.4 | 34.3 | 52.2 | 96.6 | 93.25 | 82.4 |
| 120 | | | | | | | 2.6 | 8.73 | 26.8 | 56.9 | 98.0 | 93.4 | 87.3 |

TABLE 2A

| 50 | $N_2$ | 60 | 105 | 40 | 654 | 200 | 6.5 | 14.1 | 31.3 | 46.8 | 94.4 | 87.5 | 81.9 |
|---|---|---|---|---|---|---|---|---|---|---|---|---|---|
| 60 | | | | | | | 7.0 | 15.0 | 22.5 | 43.2 | 93.5 | 85.5 | 85.9 |
| 70 | | | | | | | 6.9 | 15.3 | 30.9 | 44.2 | 93.6 | 85.5 | 81.1 |
| 80 | | | | | | | 6.5 | 15.05 | 26.85 | 43.75 | 93.9 | 85.5 | 83.4 |
| 90 | | | | | | | 6.3 | 14.1 | 31.60 | 42.7 | 93.9 | 86.1 | 79.9 |
| 100 | | | | | | | 6.4 | 14.6 | 31.5 | 44.7 | 94.2 | 86.25 | 81.0 |
| 110 | | | | | | | 9.7 | 16.2 | 28.2 | 45.8 | 91.4 | 85.2 | 83.4 |
| 120 | | | | | | | 11.1 | 18.1 | 30.4 | 40.8 | 88.8 | 81.4 | 79.8 |
| 130 | ↓ | ↓ | ↓ | ↓ | ↓ | ↓ | 12.35 | 17.85 | 30.45 | 39.35 | 87.2 | 80.9 | 79.2 |

TABLE 3

(TIME PARAMETER)

| | | LEACH TANK | | | | | ANALYSIS BY WT. | | | | EXTRACTION BY WT. | | |
|---|---|---|---|---|---|---|---|---|---|---|---|---|---|
| Time | Temp | Gas Used | Gas Overpress | Acid Conc | Vol | Cu Conc Weight | Cu | Fe | S | Insolubles | Cu | Fe | S |
| (Min) | (°C) | | (Psig) | (%) | (ML) | (GM) | (%) | (%) | (%) | (%) | (%) | (%) | (%) |
| 10 | 105 | $O_2$ | 100 | 40 | 654 | 200 | 13.6 | 18.6 | 29.6 | 34.0 | 83.7 | 75.0 | 76.5 |
| 20 | | | | | | | 12.3 | 17.4 | 29.6 | 41.6 | 87.9 | 82.4 | 80.75 |
| 30 | | | | | | | 7.5 | 14.7 | 22.7 | 52.4 | 94.2 | 88.25 | 88.4 |
| 60 | | | | | | | 7.8 | 13.2 | 31.5 | 40.2 | 92.0 | 86.2 | 78.8 |
| 75 | | | | | | | 5.9 | 12.1 | 29.5 | 49.1 | 95.1 | 89.1 | 83.75 |
| 90 | ↓ | ↓ | ↓ | ↓ | ↓ | ↓ | 2.5 | 9.1 | 30.2 | 55.7 | 98.1 | 90.3 | 85.4 |

TABLE 4

(ACID CONCENTRATION PARAMETER)

| | | LEACH TANK | | | | | ANALYSIS BY WT. | | | | EXTRACTION BY WT. | | |
|---|---|---|---|---|---|---|---|---|---|---|---|---|---|
| Acid Conc (%) | Vol (ML) | Cu Conc Weight (GM) | Time (Min.) | Temp (°C) | Gas Used | Gas Overpress (Psig) | Cu (%) | Fe (%) | S (%) | Insolubles (%) | Cu (%) | Fe (%) | S (%) |
| 10 | 1050 | 80.5 | 60 | 120 | $O_2$ | 100 | 14.0 | 17.6 | 28.3 | 36.8 | 84.5 | 79.8 | 79.25 |
| 20 | 653 | 100 | | | | | 12.8 | 17.0 | 26.9 | 39.1 | 86.55 | 83.75 | 81.4 |
| 30 | 870 | 200 | | | | | 3.2 | 9.4 | 25.7 | 58.4 | 97.6 | 93.2 | 88.2 |
| 40 | 654 | | | | | | .2 | 8.2 | — | — | 99.8 | 95.4 | — |
| 50 | 522 | | | | | | .2 | 7.6 | 18.2 | 70.2 | 99.8 | 99.5 | 93 |
| 40 | 350 | | | | | | 5.0 | 22.5 | 40.2 | 21.7 | 90.6 | 56.4 | 49.8 |
| 40 | 1050 | | | | | | 1.1 | 7.8 | 22.2 | 60.4 | 99.2 | 94.6 | 90.2 |
| 40* | 654 | ↓ | ↓ | ↓ | ↓ | ↓ | .4 | 7.0 | 22.9 | 67.4 | 99.6 | 95.6 | 90.9 |

*hi speed agitation with std prop

TABLE 5

(AGITATION PARAMETER)

| | | | LEACH TANK | | | | | | ANALYSIS BY WT. | | | | EXTRACTION BY WT. | | |
|---|---|---|---|---|---|---|---|---|---|---|---|---|---|---|---|
| Agitation | Slurry Method | Temp (°C) | Time (Min) | Acid Conc (%) | Vol (ML) | Gas Used | Gas Overpress (Psig) | Cu Conc Weight (GM) | Cu (%) | Fe (%) | S (%) | Insolubles (%) | Cu (%) | Fe (%) | S (%) |
| None | Std | 120 | 60 | 40 | 654 | $O_2$ | 100 | 200 | 6.8 | 16.3 | 25.1 | 41.9 | 93.4 | 83.6 | 83.7 |
| $O_2$ Injection | | | | | | | | | 9.9 | 15.5 | 28.1 | 38.5 | 89.5 | 83.2 | 80.2 |
| Std | | | | | | | | | .2 | 8.2 | — | — | 99.8 | 95.4 | — |
| Hi Speed | | | | | | | | | .4 | 7.0 | 22.9 | 67.4 | 99.7 | 95.6 | 90.8 |
| Std | Inject | | | | | | | | .18 | 6.83 | 28.2 | 63.8 | 99.9 | 95.5 | 88.1 |
| Std ▷ | MIx ▶ | ↓ | ↓ | ↓ | ↓ | ↓ | ↓ | ↓ | 2.7 | 10.5 | 14.2 | 75.2 | 98.5 | 94.2 | 94.9 |

▷With large bladed prop
▶In tank

EXAMPLE II

The next sample to be treated was a copper-silver concentrate with the following composition by volume:

| Cu | 24.6% |
|---|---|
| Ag | 138 OZ. PER TON |
| Fe | 27.0% |
| S | 38.0% |
| Insolubles | 7.4% |

Only the time of leach required confirmation, in view of the parameters established through Example I. See Table 6.

EXAMPLE III

The last sample was a silver-nickel-copper concentrate with the following composition by weight:

| | |
|---|---|
| Cu | 22.8% |
| Ni | 6.7% |
| Ag | 122 OZ PER TON |
| Fe | 23.0% |
| S | 39.0% |
| Insolubles | 6.8% |

Again, only a time confirmation was needed. See Table 7.

Further tests were made in the bomb at higher temperatures. The oxide formed in each case, and temperatures of 200°C (about 392°F) and above, actually formed a better ferric oxide product. However, at 150°C (about 302°F) a well behaved, readily filterable crystalline precipitate of the oxide was formed in each case.

Other tests were also made, involving seeding the leach solution with various chemicals which it was thought might catalyze precipitation when the solution was heated in an open vessel. However, none of the chemicals produced a well behaved precipitate of iron. Also, increasing the pH from 0.1 to 5.0 did not increase the filterability of the precipitate in an open vessel.

TABLE 6

COPPER SILVER CONCENTRATE
ANALYSIS OF CONCENTRATE

| | |
|---|---|
| Cu | 24.6% |
| Ag | 138 OZ PER TON |
| Fe | 27.% |
| S | 38.% |
| Insolubles | 7.4% |

(TIME PARAMETER)

| | | LEACH TANK | | | | | RESIDUE ANALYSIS BY WT. | | | | | EXTRACTION BY WT. | | | |
|---|---|---|---|---|---|---|---|---|---|---|---|---|---|---|---|
| Time | Temp | Gas Used | Overpress (Psig) | Acid Conc (%) | Vol (ML) | Cu Conc Weight (GM) | Cu (%) | Ag (Oz/ton) | Fe (%) | S (%) | Ins (%) | Cu (%) | Ag (%) | Fe (%) | S (%) |
| (Min) | (°C) | | | | | | | | | | | | | | |
| 15 | 120 | O₂ | 100 | 40 | 700 | 200 | 4.23 | 42.14 | 14.4 | 28.5 | 47.0 | 97.3 | 95.2 | 91.6 | 75.1 |
| 30 | | | | | | | 1.67 | 14.8 | 12.1 | 30.0 | 49.1 | 98.98 | 98.39 | 93.1 | 88.1 |
| 45 | | | | | | | .4 | 7.28 | 9.1 | 30.2 | 56.0 | 99.79 | 99.3 | 95.6 | 89.5 |
| 60 | | | | | | | .2 | .41 | 7.5 | 28.5 | 60.0 | 99.90 | 99.96 | 96.55 | 90.6 |
| 75 | | | | | | | .18 | .31 | 6.2 | 26.3 | 64.5 | 99.91 | 99.97 | 97.5 | 92.0 |
| 90 | | | | | | | .2 | .27 | 5.1 | 24.0 | 67.4 | 99.91 | 99.98 | 97.8 | 93.1 |
| 120 | | | | | | | .2 | .28 | 4.5 | 23.1 | 68.4 | 99.97 | 99.97 | 98.2 | 93.4 |

TABLE 7

SILVER - NICKEL - COPPER - CONCENTRATE
ANALYSIS OF CONCENTRATE

| | |
|---|---|
| Cu | 22.8% |
| Ni | 6.7% |
| Ag | 122. Oz/TON |
| Fe | 23.0% |
| S | 39.0% |
| Insolubles | 6.8% |

(TIME PARAMETER)

| | | LEACH TANK | | | | RESIDUE ANALYSIS BY WT. | | | | | | EXTRACTION BY WT. | | | | |
|---|---|---|---|---|---|---|---|---|---|---|---|---|---|---|---|---|
| Time | Temp | Gas Used | Over-press (Psig) | Acid Conc (%) | Vol (ml) | Cu Conc Wt. (gm) | Cu (%) | Ni (%) | Ag (Oz/ton) | Fe (%) | S (%) | Ins (%) | Cu (%) | Ni (%) | Ag (%) | Fe (%) | S (%) |
| (min) | (°C) | | | | | | | | | | | | | | | | |
| 15 | 120 | O₂ | 100 | 40 | 700 | 200 | 5.6 | 1.8 | 48.1 | 14.0 | 27.3 | 42.4 | 96.0 | 95.8 | 93.25 | 90.25 | 88.8 |
| 30 | | | | | | | 2.1 | .9 | 17.3 | 12.0 | 29.3 | 49.9 | 98.75 | 98.17 | 97.94 | 92.9 | 89.8 |
| 45 | | | | | | | .48 | .4 | 8.8 | 9.4 | 25.8 | 58.1 | 99.75 | 99.30 | 99.10 | 95.2 | 92.25 |
| 60 | | | | | | | .21 | .11 | .56 | 6.2 | 26.4 | 65.0 | 99.90 | 99.83 | 99.95 | 97.2 | 92.95 |
| 75 | | | | | | | .19 | .10 | .40 | 5.0 | 24.4 | 67.4 | 99.92 | 99.85 | 99.96 | 97.7 | 93.6 |
| 90 | | | | | | | .20 | .10 | .30 | 4.4 | 28.6 | 64.1 | 99.91 | 99.84 | 99.97 | 98.0 | 92.25 |
| 120 | | | | | | | .22 | .10 | .30 | 4.0 | 27.0 | 65.6 | 99.90 | 99.84 | 99.97 | 98.2 | 92.75 |

EXAMPLE IV

Filtered, raw acid, sulfate containing leach liquor from Example I at a pH of about 0.3, was boiled and evaporated to dryness; whereafter the solids which remained were redissolved in water. It was observed that the iron solids did not go into solution, but remained for the most part as an insoluble oxide.

Separately, 300 milliliters of the leach liquor from Example I at pH 0.3 were evaporated to 150 milliliters, and ammonium hydroxide was added to bring the pH of the solution up to 1.7. Subsequently, the solution was heated in a stainless steel pressure bomb to a constant 150°C (302°F) while the bomb was purged of gases with oxygen for 20 minutes. When the bomb was opened, it was observed that ferric oxide had precipitated.

EXAMPLE V

A stoichiometrically balanced, filtered, nitric acid leach liquor containing 50 grams per liter of copper and 35 grams per liter of iron as mixed sulfate/nitrate, was heated in a stainless steel autoclave to 260°C (500°F). The stated temperature was held only for about 5 minutes, and the solution was allowed to cool rapidly. The pH was maintained at 1.0. Recovery of the iron, as black ferric oxide, was 99% of the total in solution. The solid was granular and easily filterable, and contained no detectable copper.

EXAMPLE VI

It was observed that at temperatures above about 125°C (257°F), there was a sharp increase in sulfation of the sulfur in the unfiltered leach liquor resulting from Example I. Moreover, it was observed that pH adjustments in the filtered leach liquors subjected to autoclaving in Example IV, did not appreciably affect the performance of the iron oxide precipitate. Therefore, tests were conducted in which the leach solution of Example I was subjected to temperatures above about 125°C (257°F) during the leach operation, and it was observed that a readily filterable hydrous oxide of iron precipitated directly from the solution during the leach. In the region immediately above about 160°C (320°F), the precipitate appears to be less susceptible to filtration.

A similar oxide precipitation effect is achieved with copper-silver and silver-nickel-copper samples such as those used in Examples II and III. Likewise, the effect can also be achieved with cobalt containing samples.

EXAMPLE VII

A concentrate containing by weight 15% copper, 10% zinc and 17% iron was leached with nitric acid at 40% by volume concentration. The temperature of the solution was maintained at 138°C (280°F) and the pressure of the autoclave was held at 80 psig for 45 minutes. The solution was agitated by an overhead stirrer at 1000 rpm.

The leached slurry was filtered to separate the solid fraction from the filtrate. The solid fraction contained primarily precipitated hydroxides of iron. The filtered leach liquor contained 56.2 grams per liter of copper, 8.7 grams per liter of iron, and 30.1 grams per liter of zinc.

EXAMPLE VIII

Zinc has a similar chemistry in nitric acid solution and can be expected to react the same as copper, silver, nickel and cobalt, under the foregoing parameters, when a zinc sulfide ore is subjected to the process of Examples I–VII.

In the following Examples, leach liquors of the type developed in the foregoing Examples I–VIII are subjected to solvent extraction for the metal recovery stage, using either the aforementioned LIX-64N, an alpha substituted hydroxy-oxime manufactured by General Mills Corporation of Minneapolis, Minn., or "Kelex 100", a hydrocarbyl-substituted 8-hydroxyquinoline manufactured by Ashland Oil and Refining Company of Houston, Tex.

EXAMPLE IX

A leach liquor containing 53 grams per liter of copper and 5.9 grams per liter of iron was contacted with an organic solution of 30% by volume of General Mills LIX-64N and 70% by volume kerosene, in a three stage counter-current mixer-settler apparatus. The pH of the liquor was adjusted to about 1.5 before it was introduced to the first extraction stage, and behind each mixer-settler stage there was a pH adjustment tank from which the aqueous feed and aqueous recycle streams were drawn for the stage. In each of the tanks, the pH was continuously maintained at about 1.5 by adding ammonium hydroxide. In addition, the tanks were sized so that the hydroxide precipitates which formed, were redissolved, and screens and/or filter cloths were provided so that the precipitates could not be carried in to the next stage until they had redissolved.

An organic to leach liquor feed ratio of 12.7 to 1 was used. With an aqueous recycle for each stage, this ratio was reduced to 1.12 to 1 to insure that the phases mixed at a good rate and that there was a good mass transfer rate. During the contact operation, 5.9 milliliters per minute of aqueous leach liquor were fed to the first stage, and 75.1 milliliters per minute of the organic phase were fed to the third stage. The aqueous phase exited from the settler into the pH adjustment tank, and of the solution in the latter 61 milliliters per minute were recycled back to the mixing tank and about 6 milliliters per minute were advanced to the second extraction stage. This basic scheme was also followed for the remainder of the extraction stages. It was found that 85.3% of the copper in the liquor was extracted in the first stage, 11.5% in the second stage, and 2.6% in the third stage. The raffinate flowing from the third stage pH adjustment tank contained 0.34 gram per liter of copper, representing about 99.4% extraction of the copper. None of the other metals in the liquor precipitated during the entire operation.

EXAMPLE X

In similar fashion, a filtered leach liquor containing 65 grams per liter of copper was contacted counter-currently in a continuous three-stage mixer-settler apparatus, and the pH of the liquor was maintained at 1.5 between stages through the addition of ammonium hydroxide to the same. Also, an organic to aqueous flow ratio of 1.12 to 1 was maintained throughout by using an aqueous recycle stream. Again the organic phase contained 30% by volume LIX-64N in kerosene. 99.6% of the copper in the liquor was extracted without any other metal precipitating.

EXAMPLE XI

Pregnant organic phase was transferred continuously from an extraction section such as the above to a two-stage (counter-current) mixer-settler stripping apparatus, and an organic to aqueous flow ratio of 1.87 to 1 was maintained in the apparatus. Stripping was accomplished with a sulfuric acid solution containing 180 grams per liter of sulfuric acid. The initial electrolyte contained 20 grams per liter of copper and the final electrolyte concentration was 30 grams per liter of copper, thus representing a copper transfer to the electrolyte of 10 grams per liter. 93.4% of the copper in the pregnant organic phase was stripped and the balance was recycled through the extraction section.

EXAMPLE XII

An electrowinning apparatus was used in conjunction with a continuous liquid ion exchange system of the type employed in Examples IX – XI. The apparatus operated with a current density of 25 amps per square foot, and with air agitation and electrolyte recycle. The cathodes produced were analyzed at 99.8 + or − 0.2% pure copper and with no detectable iron or lead present. The electrical current efficiency was greater than 87.7%.

EXAMPLE XIII

The pH of a chalcopyrite leach liquor was adjusted to 1.8 with ammonium hydroxide and the liquor was contacted twice with an organic solution containing by volume 10% of Ashland's "Kelex 100", 10% decanol, and 80% kerosene. The liquor contained 59.1 grams per liter of copper and 7.1 grams per liter of iron. Between contacts the pH was adjusted again to 1.8. An organic to aqueous ratio of 8.4 to 1 was used. No detectable copper was left in the aqueous phase and the extraction was essentially 100% complete. Sulfuric acid at 180 grams per liter was used to strip the copper from the organic phase. Two contacts at the organic to aqueous ratio of 8.4 to 1 were made. 77% of the copper was transferred to the aqueous sulfuric phase.

What is claimed is:

1. In the process of recovering copper from a sulfur and iron containing ore of the same, the steps of forming an aqueous nitric acid leach solution of the ore, heating the solution under containment to a temperature at or above the melting point of sulfur to establish an iron content of no greater than 15 grams of iron values per liter in the leach liquor, adding an acid neutralizer to the liquor to establish a pH of about 1–2 therein and to produce salts of the acid which are soluble in the liquor, contacting the liquor with a copper specific aqueous insoluble organic extractant liquid while maintaining the foregoing pH in the liquor to extract the copper into the extractant liquid, relatively separating the organic extractant liquid and the liquor, and recovering the copper from the organic extractant liquid.

2. The process according to claim 1 wherein the leach liquor is heated to a temperature above about 125°C to precipitate iron values therefrom, and the iron precipitate is relatively separated from the liquor before the liquor is contacted with the extractant liquid.

3. The process according to claim 1 wherein a portion of the aqueous phase is recycled in the extraction stage and the recycled portion is adjusted in pH during the recycling operation to maintain the pH of the liquor at about 1–2.

4. The process according to claim 1 wherein the acid neutralizer is selected from the group consisting of hydroxides, carbonates, bicarbonates, and phosphates of ammonia and the alkali metals.

5. The process according to claim 1 wherein the extractant in the organic extractant liquid is selected from the group consisting of the alpha-substituted hydroxy-oximes and the hydrocarbyl-substituted 8-hydroxyquinolines.

6. The process according to claim 1 wherein the acid insolubles are relatively separated from the liquor before the liquor is contacted with the extractant liquid.

7. The process according to claim 6 wherein the liquor is subjected to autoclaving at a temperature above about 149°C to precipitate dissolved iron as the oxide thereof, and the oxide is relatively separated from the liquor before the liquor is contacted with the extractant liquid.

* * * * *